(12) United States Patent
Duret

(10) Patent No.: US 7,556,027 B2
(45) Date of Patent: Jul. 7, 2009

(54) INTERNAL-COMBUSTION ENGINE CONTROL METHOD AND ENGINE USING SAME

(75) Inventor: Pierre Duret, Sartrouville (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 11/869,865

(22) Filed: Oct. 10, 2007

(65) Prior Publication Data

US 2008/0091329 A1    Apr. 17, 2008

(30) Foreign Application Priority Data

Oct. 11, 2006    (FR) .................................. 06 08975

(51) Int. Cl.
*F02B 47/08*    (2006.01)

(52) U.S. Cl. ..................... 123/568.13; 123/568.23; 123/90.11; 123/90.12; 123/90.15; 123/321

(58) Field of Classification Search ............... 123/79 R, 123/90.11–90.18, 568.13, 568.23, 321
See application file for complete search history.

(56) References Cited

U.S. PATENT DOCUMENTS

| 2,215,579 | A | * | 9/1940 | Eichelberg | .................. | 123/76 |
| 4,075,986 | A | * | 2/1978 | Keck | ..................... | 123/79 R |
| 4,273,083 | A | * | 6/1981 | Moiroux | ................ | 123/79 R |
| 5,020,486 | A | * | 6/1991 | Unger | ................. | 123/79 R |
| 5,331,929 | A | * | 7/1994 | Plantan | ................. | 123/79 R |
| 6,293,236 | B1 | * | 9/2001 | De Francisco | ............ | 123/79 R |
| 6,561,145 | B1 |  | 5/2003 | Sockhausen et al. | | |
| 7,258,104 | B2 | * | 8/2007 | Young et al. | ................. | 123/432 |
| 7,308,872 | B2 | * | 12/2007 | Sellnau et al. | ............ | 123/90.16 |
| 2004/0094117 | A1 |  | 5/2004 | Widener et al. | | |

\* cited by examiner

*Primary Examiner*—Erick Solis
(74) *Attorney, Agent, or Firm*—Antonelli, Terry, Stout & Kraus, LLP.

(57) ABSTRACT

The present invention relates to a method of controlling an internal-combustion engine comprising at least one cylinder (10) with at least one burnt gas exhaust means (12) including an exhaust valve (16) whose opening/closing is controlled by control means (22) and an exhaust pipe (14) connected to an exhaust line (18, 20), at least two intake means (26, 28) comprising each a valve (32, 36) whose opening/closing is controlled by a dedicated actuating means (46, 48) and a pipe (30, 34). The method, during low load or medium load running of the engine:

controls the closed position of exhaust valve (16) and
  controls one (36) of the intake valves so as to operate it as a burnt gas discharge valve.

23 Claims, 1 Drawing Sheet

INTERNAL-COMBUSTION ENGINE CONTROL METHOD AND ENGINE USING SAME

BACKGROUND OF THE INVENTION

1. Field of the Invention

The present invention relates to an internal-combustion engine control method and to an engine using such a method.

2. Description of the Prior Art

There are known engines wherein opening/closing of the intake valve(s) is controlled by variable-timing control means. In this type of timing, the conventional camshaft is replaced by an actuating means dedicated to each valve, such as an electromagnetic or hydraulic or electrohydraulic or pneumatic or electropneumatic actuator, which acts directly or indirectly upon the valve rod. This allows changing the opening angles and times of the intake valves, as well as their lift laws or their opening frequency, while allowing multi-opening during a single running cycle of this engine. On the other hand, opening/closing of the exhaust valve(s) is controlled by any conventional timing means, such as a camshaft driven in rotation by a belt (or a timing chain) connected to the engine crankshaft. This engine type with two timing architectures is more commonly known as "half camless".

Similarly, there are engines known as "full camless" that comprise no camshaft, whether for the intake valves or for the exhaust valves. In this case, the engine comprises an actuating means dedicated to each valve, such as an electromagnetic or hydraulic or electrohydraulic or pneumatic or electropneumatic actuator, which acts directly or indirectly upon the valve rod of the intake and exhaust valves.

In both engine types it is possible for example to have, for low and medium loads, a specific combustion such as a combustion with controlled auto-ignition (CAI) or a combustion with homogeneous charge compression ignition (HCCI) through phasing of the intake and exhaust valves allowing opening/closing of these valves with re-introduction or retention of burnt gases in the combustion chamber, as described in French Patent 2,760,487 filed by the assignee on combustion with controlled auto-ignition.

In the case of a half camless engine, considering that the exhaust valves are controlled by a camshaft, it is difficult to obtain such a combustion over a significant engine running range because the lift laws of these exhaust valves are difficult to modify during operation or they can only be modified over a very limited range.

For a full camless engine, the aforementioned drawback can be solved but to the detriment of an excessive production cost for this engine with installation of an actuator for each intake and exhaust valve, associated with a very sophisticated control of these actuators.

Furthermore, in the case of high engine loads, actuating the exhaust valves is difficult considering the stresses imposed by the high back pressures at the exhaust.

The present invention aims to overcome the aforementioned drawbacks by means of a method allowing a half camless engine to run like a full camless engine for low and medium loads.

SUMMARY OF THE INVENTION

The present invention thus relates to a method of controlling an internal-combustion engine comprising at least one cylinder with at least one burnt gas exhaust means including an exhaust valve whose opening/closing is controlled by control means and an exhaust pipe connected to an exhaust line, with at least two intake means comprising each a valve whose opening/closing is controlled by a dedicated actuating means and a pipe, during low load or medium load running of the engine: controlling the closed position of the exhaust valve; and controlling one of the intake valves so as to operate it as a burnt gas discharge valve.

The method can discharge the burnt gases into the exhaust line via a conduit.

The method can also shut off the mouth of the pipe comprising the discharge valve.

The invention also relates to an internal-combustion engine with at least one cylinder provided with at least one burnt gas exhaust means including an exhaust valve whose opening/closing is controlled by control means and an exhaust pipe, an exhaust line and at least two intake means comprising each a pipe and a valve whose opening/closing is controlled by a dedicated actuating means, comprising means for controlling the exhaust valve control means and means for controlling one of the valves of the intake means in order to change the opening law thereof so that it acts as a burnt gas discharge valve.

This engine can comprise a conduit connecting the pipe of the intake means comprising the discharge valve to the exhaust line.

The pipe of the intake means comprising the discharge valve can carry a means for shutting off the mouth of the pipe.

The exhaust valve control means comprises disconnecting means allowing the control means to be activated or deactivated.

The invention can relate to a use of the method for a combustion with controlled auto-ignition of the engine.

Advantageously, the invention can be used for multi-time engine running or for running of the engine with engine braking.

Another use of the method can concern running an engine under cold start conditions to reduce emissions.

BRIEF DESCRIPTION OF THE DRAWINGS

Other features and advantages of the invention will be clear from reading the description hereafter, given by way of non-limitative example, with reference to the sole accompanying FIGURE showing a half camless engine using the method according to the invention.

DETAILED DESCRIPTION OF THE INVENTION

Figure 1:
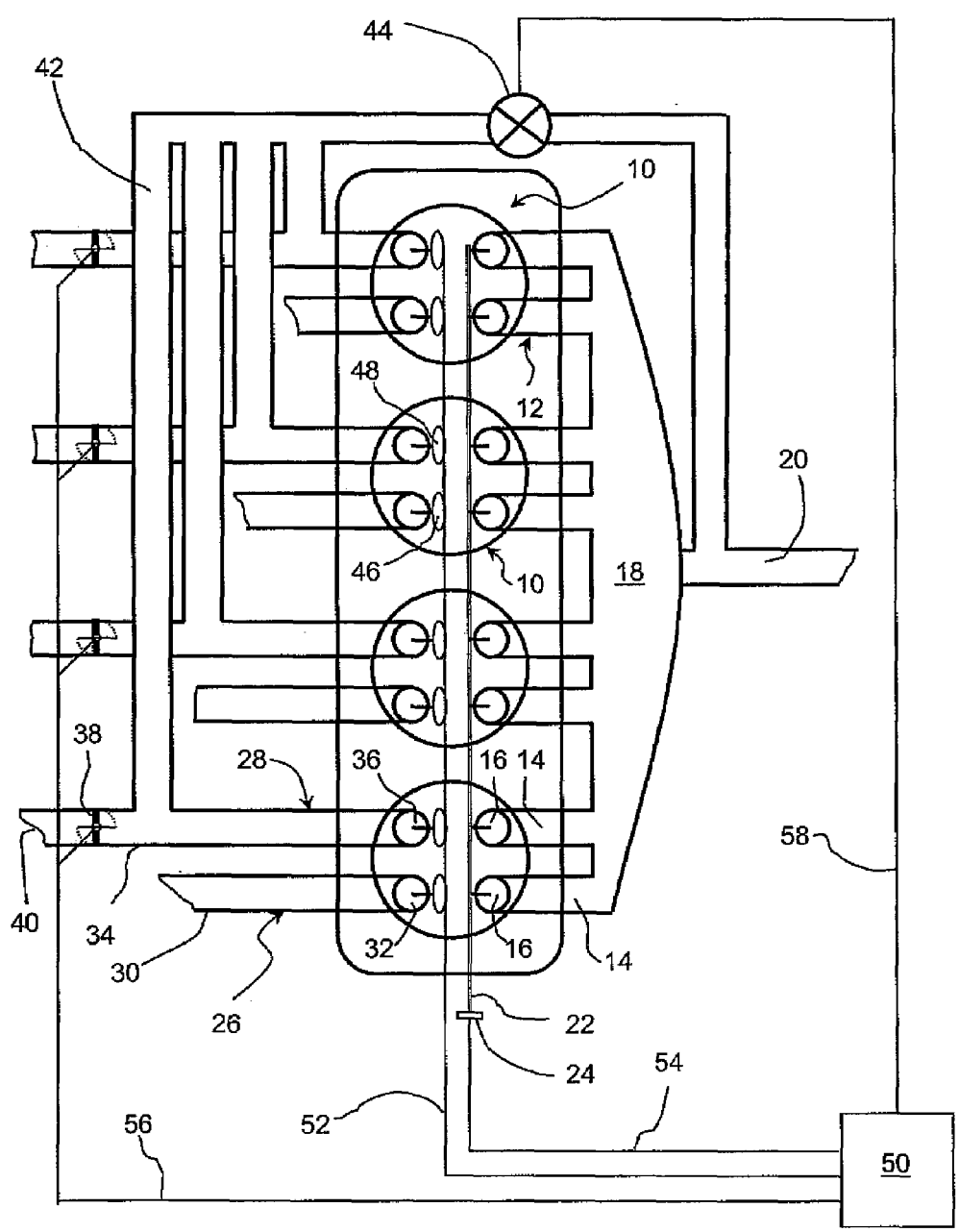

The description hereafter gives an example of an embodiment of the invention applicable to a diesel type internal-combustion engine, which may be supercharged, but it is also applicable to any other type of internal-combustion engine, notably of spark ignition type.

In the sole FIGURE, the internal-combustion engine comprises at least one cylinder 10, (four cylinders are illustrated), including a combustion chamber in which combustion of a fuel mixture takes place.

This cylinder comprises at least one burnt gas exhaust means 12, (two are illustrated), including an exhaust pipe 14 and a shut-off means such as an exhaust valve 16. Exhaust pipes 14 open into an exhaust line with an exhaust manifold 18 connected to a tailpipe 20 allowing discharge of the burnt gases from the combustion chambers and may be to pollution treatment thereof. Opening and closing of exhaust valves 16 is controlled by any known means such as a camshaft 22, driven in rotational synchronism with the crankshaft by a timing belt or chain (not shown). This camshaft carries means 24 for disconnecting the opening of the exhaust valves such as, for example, those allowing disengagement from the timing belt (or chain). These disconnecting means allow stopping rotation of the camshaft and thus to make it inactive on the exhaust valves so that they remain in closed position.

Other means can be used such as, for example, hydraulic disconnection of the cam actuation, more commonly known as valve opening deactivation.

This cylinder also comprises at least two intake means 26, 28, one 28 being used as a burnt gas discharge means when the engine runs under low or medium load conditions, as explained in detail in the description below.

Intake means 26, referred to as conventional intake means, comprises an intake pipe 30 associated with a shut-off means such as an intake valve 32.

Intake means 28, referred to as intake/discharge means, comprises an intake/discharge pipe 34 and an intake/discharge valve 36. Intake/discharge 34 carries a shutter 38, preferably with a bistable position (fully open or fully closed), located upstream from mouth 40 of this pipe and allowing control of any fluid circulation in the pipe from and towards this mouth. A conduit 42 starts at intake/discharge pipe 34 between intake/discharge valve 36 and shutter 38, and it opens onto exhaust manifold 18 or, in the example shown, on tailpipe 20. This conduit carries a valve 44, preferably of variable opening type, arranged between the origin of conduit 42 and its junction with tailpipe 20, which allows controlling of the fluid circulation in this conduit. Opening and closing of each intake valve 32 and intake/discharge valve 36 is controlled by a dedicated actuating means, 46 and 48 respectively, allowing achieving a totally variable timing or, at least, allowing phasing of these valves and their opening/closing times to be varied. It is therefore possible to use electromagnetic actuators or hydraulic, electrohydraulic, pneumatic or electropneumatic actuators that act upon the valve rod they control. For simplification reasons, electromagnetic actuators will be mentioned in the description hereafter for control of the intake and intake/discharge valves.

Of course, without departing from the scope of the invention, the openings of intake 30 and intake/discharge valves 40 can be connected to a single intake manifold (not shown) so as to take advantage of the various operational elements of the engine, such as intake air filtration or engine supercharging.

This engine also comprises a processing unit 50, referred to as engine calculator, that contains mappings or data tables allowing evaluation, according to engine parameters such as the engine speed, its load or the intake and exhaust pressures, the power that has to be generated by this engine to meet the driver's throttle control and, consequently, to manage the desired running conditions of this engine, from low loads to medium loads or from high loads to very high loads.

More precisely, this engine calculator allows, according to these running conditions, to control the lift laws of intake 32 and intake/discharge valves 36 by means of a control line 52 acting upon electromagnetic actuators 46 and 48, to activate or deactivate exhaust camshaft 22 by acting by means of a control line 54 upon disconnecting means 24, to control full opening or full closing of shutters 38 by means of a line 56 and to control valve 44 through a line 58.

Thus, when the engine runs in a conventional mode, generally with high to very high loads, it works as a half camless engine while using camshaft 22 for exhaust valves 16 and electromagnetic actuators 46 and 48 for intake 32 and intake/discharge valves 36.

More precisely, through line 54 acting upon disconnecting means 24, engine calculator 50 makes (or leaves) camshaft 22, which conventionally controls opening and closing of the exhaust valves during the engine exhaust phase, operational. This engine calculator also controls actuators 46 and 48 through line 52 so that the opening/closing timing of intake 32 and intake/discharge valves 36 is achieved conventionally with valve 36 working as an intake valve. Similarly, engine calculator 50 controls through line 56 shutters 38 so as to have them in a configuration of full opening of mouth 40 of intake/discharge pipe 34. Finally, this engine calculator acts upon valve 44 in cases where it is necessary to re-inject burnt gases to the intake, an operation that is better known to those skilled in the art as EGR (Exhaust Gas Recirculation).

In this configuration, intake/discharge means 28 is used as an air intake means and conduit 42 with its valve 44 can be used as an EGR line, for mixing part of the burnt gases circulating in the exhaust line with the intake air to achieve an air/hot gas mixture promoting combustion of the fuel mixture in the combustion chamber of each cylinder and reducing emissions.

Thus, the air admitted through pipes 30 and 34, may be with a proportion of burnt gases through line 42, enters the combustion chamber of cylinder 10, then a combustion occurs after injection of a fuel and compression of the fuel mixture. The burnt gases resulting from this combustion are then conventionally discharged from the combustion chamber when exhaust valves 16 open under the action of camshaft 22.

During low load (or up to medium load) running and during engine idle speed, the engine calculator controls the various engine devices (disconnecting means 24, electromagnetic actuators, shutters 38 and valve 44) to change from running conditions with a half camless engine to running conditions with a full camless engine where only actuators 46 and 48 are used. This has the advantage of reducing the fuel consumption and emissions, and it can also increase the engine braking capacity.

Engine calculator 50 therefore deactivates camshaft 22 through disconnecting means 24 by uncoupling it from the timing belt or chain that drives it in rotation. In this case, exhaust valves 16 remain constantly closed (another solution would consist in maintaining the camshaft in rotation and in deactivating opening of the valves by means of a hydraulic control). Simultaneously, the engine calculator controls closing of the mouth of intake/discharge pipe 34 through fully closed positioning of shutter 38, as shown by the solid lines in the FIGURE, so as to shut off any circulation towards this mouth 40, and it opens valve 44 in order to allow fluid circulation in conduit 42.

In this configuration, the engine only runs with valves 32 and 36. Intake valve 32 allows air to be fed into the combustion chamber for pipe 30 and intake/discharge valve 36 is used as discharge (or exhaust) valve for the burnt gases resulting from the combustion of the fuel mixture in the combustion chamber of the cylinder. These burnt gases are discharged through this valve, then they circulate in the portion of pipe 28 shut off by shutter 38, then in conduit 42 prior to being eventually sent into tailpipe 20, that is in the opposite direction to that of the conventional mode when this conduit is used as an EGR conduit.

Thus, by means of this full camless configuration of the engine, all the intake and exhaust valve phasing possibilities allowing opening/closing of these valves with re-introduction or retention of burnt gases in the combustion chamber can be considered. This allows, in the case of controlled auto-ignition (CAI) or homogeneous charge compression ignition (HCCI) combustion, to intake again and to retain the burnt gases in the combustion chamber so as to compress them thereafter.

Advantageously, it is also possible to use the method according to the invention to operate an engine according to a multi-time mode, or to achieve engine braking for this engine.

Running of this engine according to the two-stroke cycle can be obtained for example by doubling the opening frequency of valves 32 and 36 with suitable opening laws. This has the advantage of reducing the indicated power produced upon each engine cycle and thus allows increasing the load zone where running under CAI or HCCI conditions can be obtained.

To achieve engine braking, the opening lift laws of valves 32 and 36 are designed for the gas mixture allowed into the combustion chamber to be compressed up to the Bottom Dead Centre. From this configuration, valve 36 just has to be opened at compression end to lose the energy that was used for compression of the gas mixture, which results in a negative gas compression work that will act as an engine brake.

Using the method according to the invention upon engine cold starting can also be considered.

It is thus possible, with dedicated valve opening laws, to reduce emissions by increasing the proportion of residual burnt gas retained and, consequently, by raising the temperature of the feedstock confined and compressed in the combustion chamber.

The present invention is not limited to the embodiment example described above and it encompasses any variant and equivalent.

The invention claimed is:

1. A method of controlling an internal combustion engine including at least one cylinder, each cylinder including at least one burnt gas exhaust means including an exhaust valve with opening and closing thereof being controlled by a control means and an exhaust pipe connected to an exhaust line, at least two intake means each comprising a valve with opening and closing thereof being controlled by an actuating means and a pipe comprising:
   controlling one of the intake valves to function as an intake valve during low or medium loads;
   controlling a closed position of the exhaust valve of the at least one burnt exhaust means during low or medium loads; and
   controlling another of the intake valves to change an opening law thereof to function as a burnt gas discharge valve during low or medium loads.

2. An engine control method as claimed in claim 1, comprising:
   discharging burnt gases towards the exhaust line with a conduit.

3. An engine control method as claimed in claim 1, comprising:
   shutting off an opening of the pipe of one of the at least two intake means with a discharge valve.

4. An internal combustion engine comprising at least one cylinder, each cylinder including at least one burnt gas exhaust means including an exhaust valve with opening and closing thereof being controlled by a control means and an exhaust pipe connected to an exhaust line and at least two intake means each comprising a pipe and a valve with opening and closing thereof being controlled by a actuating means, means for controlling a closed position of the exhaust valve of the at least one burnt exhaust means during low or medium loads and means for controlling one of the valves of the intake means to control one of the intake valves to function as an intake valve during low or medium loads and to change an opening law thereof of another of the intake valves to function as a burnt gas discharge valve.

5. An internal combustion engine as claimed in claim 4, comprising a conduit, connecting a pipe of the at least two intake means to the exhaust line, the conduit comprising a discharge valve coupled to the exhaust line.

6. An internal combustion engine as claimed in claim 4, wherein a pipe of the intake means comprises a discharge valve including a means for shutting off an opening of the pipe of the at least two intake means.

7. An internal combustion engine as claimed in claim 5, wherein a pipe of the intake means comprises a discharge valve including a means for shutting off an opening of the pipe of the at least two intake means.

8. An internal combustion engine as claimed in claim 4, wherein the means for controlling one of the exhaust valve includes means for activating or deactivating the control means.

9. A method as claimed in claim 1 comprising controlling auto-ignition of the engine.

10. A method as claimed in claim 2 comprising controlling auto-ignition of the engine.

11. A method as claimed in claim 3 comprising controlling auto-ignition of the engine.

12. A method as claimed in claim 1 comprising controlling combustion of the engine with a homogeneous charge compression ignition of the engine.

13. A method as claimed in claim 2 comprising controlling combustion of the engine with a homogeneous charge compression ignition of the engine.

14. A method as claimed in claim 3 comprising controlling combustion of the engine with a homogeneous charge compression ignition of the engine.

15. A method as claimed in claim 1 comprising controlling multi-time running of the engine.

16. A method as claimed in claim 2 comprising controlling multi-time running of the engine.

17. A method as claimed in claim 3 comprising controlling multi-time running of the engine.

18. A method as claimed in claim 1 comprising controlling running of the engine with engine braking.

19. A method as claimed in claim 2 comprising controlling running of the engine with engine braking.

20. A method as claimed in claim 3 comprising controlling running of the engine with engine braking.

21. A method as claimed in claim 1 comprising controlling running of the engine under cold start conditions to reduce emissions.

22. A method as claimed in claim 2 comprising controlling running of the engine under cold start conditions to reduce emissions.

23. A method as claimed in claim 3 comprising controlling running of the engine under cold start conditions to reduce emissions.

* * * * *